US012737142B2

(12) United States Patent
He

(10) Patent No.: US 12,737,142 B2
(45) Date of Patent: Sep. 15, 2026

(54) METHOD AND APPARATUS FOR DATA WRITING IN DISTRIBUTED STORAGE SYSTEM

(71) Applicant: New H3C Information Technologies Co., Ltd., Hangzhou (CN)

(72) Inventor: Xiaojin He, Beijing (CN)

(73) Assignee: New H3C Information Technologies Co., Ltd., Hangzhou (CN)

( * ) Notice: Subject to any disclaimer, the term of this patent is extended or adjusted under 35 U.S.C. 154(b) by 30 days.

(21) Appl. No.: 19/096,318

(22) Filed: Mar. 31, 2025

(65) Prior Publication Data

US 2026/0154006 A1 Jun. 4, 2026

(30) Foreign Application Priority Data

Dec. 4, 2024 (CN) ......................... 202411774043.5

(51) Int. Cl.
*G06F 3/00* (2006.01)
*G06F 3/06* (2006.01)

(52) U.S. Cl.
CPC .......... *G06F 3/0659* (2013.01); *G06F 3/0619* (2013.01); *G06F 3/0631* (2013.01); *G06F 3/067* (2013.01)

(58) Field of Classification Search
None
See application file for complete search history.

(56) References Cited

U.S. PATENT DOCUMENTS 10,255,192 B2 * 4/2019 Ke ........................ G06F 3/0679
2006/0053287 A1 3/2006 Kitamura
2016/0378364 A1 12/2016 Malina et al.
2020/0042444 A1 2/2020 Kang et al.

FOREIGN PATENT DOCUMENTS

CN 109032526 A 12/2018
CN 111158587 A 5/2020
CN 112527186 A 3/2021
CN 115268773 A 11/2022
CN 118259823 A 6/2024
CN 119002804 A 11/2024

OTHER PUBLICATIONS

Extended European Search Report for EP 25167333.1 by European Patent Office dated Sep. 19, 2025.

* cited by examiner

*Primary Examiner* — Midys Rojas

(74) *Attorney, Agent, or Firm* — BROADVIEW IP LAW, PC

(57) ABSTRACT

A method for data writing in a distributed storage system, and electronic device are provided. In response to determining that any storage node receives, via a client component, a write request with a large volume of written data, the storage node sends, via the client component, request information related to the written data with a small data volume to a storage engine. The storage engine then divides the written data into multiple written data blocks and allocates a physical address in an Object-based Storage Device (OSD) corresponding to each written data block. This allows the OSD corresponding to each written data block, upon receiving the data block, to write the written data block to its allocated physical address in the OSD. Besides, the written data does not pass through the storage engine, reducing the data transmission volume during the writing process and minimizes the waste of bandwidth.

18 Claims, 5 Drawing Sheets

METHOD AND APPARATUS FOR DATA WRITING IN DISTRIBUTED STORAGE SYSTEM

CROSS-REFERENCE TO RELATED APPLICATION

This application claims priority to Chinese Patent Application No. 2024117740435, filed in China National Intellectual Property Administration on Dec. 4, 2024, the disclosure of which is incorporated herein by reference in its entirety for all purposes.

TECHNICAL FIELD

The present disclosure relates to the field of distributed storage technology, specifically to a method, an apparatus for data writing in a distributed storage system, and an electronic device.

BACKGROUND

Nowadays, in distributed storage systems, a virtual layer is always set up within storage nodes. Data received by client components that needs to be written is first sent to this virtual layer, which then aggregates the data and calculates checksum data. Finally, the virtual layer divides the written data into multiple data blocks and writes them separately into different OSDs. Writing data in this manner is not performance-friendly for write requests that involve a large volume of written data, resulting in a data transmission volume that is far greater than the actual written data during the writing process. This leads to a waste of network bandwidth.

SUMMARY

In view of this, the present disclosure provides a method, an apparatus for data writing in a distributed storage system, and an electronic device, to reduce the data transmission volume during the writing process.

The technical solution provided by the present disclosure is as follows:

as an example of the present disclosure, a method for data writing in a distributed storage system is proposed. The distributed storage system includes one or more storage nodes and one or more Object-based Storage Devices (OSDs). Each storage node is configured with a client component and a storage engine. The method includes:

receiving a write request via the client component; upon determining a volume of written data indicated by the write request is greater than or equal to a first preset threshold, sending write request information related to the written data to the storage engine via the client component; receiving the write request information via the storage engine;

dividing the written data into a plurality of written data blocks in response to determining that no ongoing read or write request conflicts with the write request information; allocating different OSDs to the plurality of data blocks, respectively and allocating, to each data block, a physical write address in an OSD allocated to the data block;

sending reference information of each written data block to each OSD allocated to each written data block via the storage engine, where the reference information of each written data block comprises the physical write address in the OSD allocated to the written data block, so that each written data block is to be obtained by the OSD allocated to each written data block and written to the physical write address allocated to each written data block.

According to an example of a second aspect of the present disclosure, an electronic device in a distributed storage system is proposed. The distributed storage system includes one or more storage nodes and one or more Object-based Storage Devices (OSDs). Each storage node is configured with a client component and a storage engine. The electronic device includes: a processor and a non-transitory machine-readable storage medium for storing computer instructions, wherein the computer instructions are executed by the processor to perform operations including:

receiving a write request via a client component of any storage node; upon determining that a volume of written data indicated by the write request is greater than or equal to a first preset threshold, sending write request information related to the written data to a storage engine of the storage node via the client component; receiving the write request information via the storage engine;

dividing the written data into a plurality of written data blocks in response to determining that no ongoing read or write request conflicts with the write request information; allocating different Object-based Storage Devices (OSDs) to the plurality of data blocks, respectively and allocating, to each data block, a physical write address in an OSD allocated to the data block;

sending reference information of each written data block to each OSD allocated to each written data block via the storage engine, wherein the reference information of each written data block comprises the physical write address in the OSD allocated to the written data block, so that each written data block is to be obtained by the OSD allocated to each written data block and written to the physical write address allocated to each written data block.

In the present disclosure, from the above technical solutions, it may be seen that in response to determining that any storage node receives a write request with a large volume of written data via the client component, the storage node sends request information related to the data, which has a very small data volume, to the storage engine via the client component. The storage engine then divides the data into multiple data blocks and allocates a physical write address in an OSD for writing each data block. This allows the OSD corresponding to each data block to write the data block to its corresponding physical write address in the OSD upon obtaining the data block. Besides, the written data does not pass through the storage engine, significantly reducing the data transmission volume during the writing process and minimizing bandwidth waste.

BRIEF DESCRIPTION OF DRAWINGS

The accompanying drawings incorporated herein and forming part of this specification illustrate examples consistent with the present disclosure and, together with the specification, serve to explain the principles of the present disclosure.

DETAILED DESCRIPTION

In order to enable those skilled in the art to better understand the technical solutions provided in the examples of the present disclosure, and to make the aforementioned objectives, features, and advantages of the examples of the present disclosure more apparent and easier to understand, further detailed descriptions of the technical solutions in the examples of the present disclosure are provided below in conjunction with the accompanying drawings.

In distributed storage systems, transmitting data through the TCP/IP protocol involves multiple copies of the transmitted data, consuming CPU performance a lot. To reduce CPU consumption, technologies have emerged that enable apparatuses to directly read and write memory without going through the CPU, such as Remote Direct Memory Access (RDMA).

Below is a brief introduction to the Ceph architecture in distributed storage.

Figure 2:
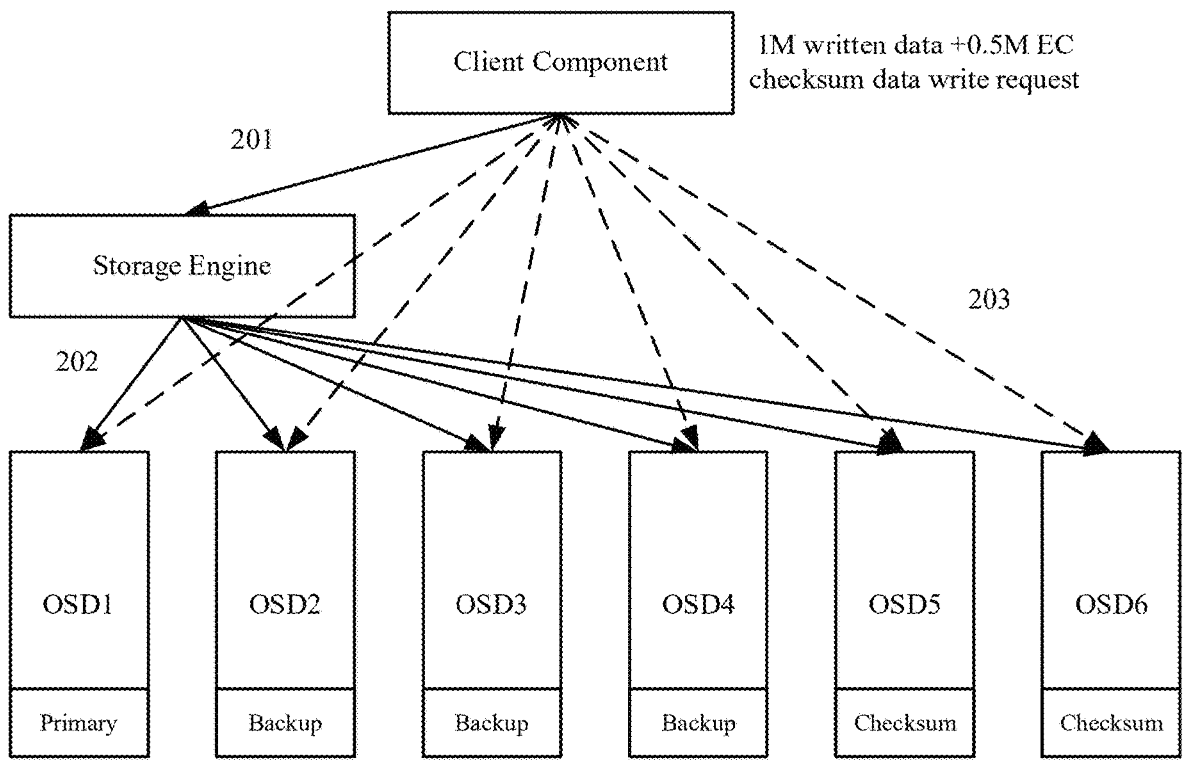
FIG. 2 is a schematic diagram of direct large input/output (I/O) write provided in an example of the present disclosure.

Taking the 4+2 erasure coding (EC) scheme (an EC strategy where original data in a distributed storage is divided into 4 data blocks, and 2 redundancy blocks are generated, with the redundancy blocks to recover lost or damaged data) as an example, this architecture includes a client component and six Object-based Storage Devices (OSDs). As shown in FIG. 2, wherein the OSDs include one primary OSD (OSD1), three backup OSDs (OSD2, OSD3, OSD4), and two checksum OSDs (OSD5, OSD6).

In the Ceph architecture, taking the example where the volume of data indicated by a write request received by the client component is 1 M, this 1 M of data may be sent from the client component to the OSD1, and EC calculations are performed in the OSD1 to generate additional 0.5 M of checksum data.

The OSD1 performs EC dividing on the IM of original data and the 0.5 M of checksum data, i.e., divides the IM of original data and the 0.5 M of checksum data into multiple data blocks, determines, for each data block, the OSD corresponding to the data block, and sends each data block to the designated location in its corresponding OSD.

The IM of original data is divided into 4 data blocks, and the 0.5 M of checksum data is divided into 2 data blocks. One data block of the original data, which is 0.25 M, is saved by OSD1, and the rest three data blocks of the original data, each of which is 0.25 M, are respectively sent to OSD2, OSD3, OSD4 for storage. The two data blocks of the checksum data (each data block is 0.25 M) are sent to OSD5, OSD6 for storage, respectively.

In the process described above, the total volume of data transmitted over the network is 1 M+0.25 M*5=2.25 M, that is, IM sent to OSD1 by the client component and the data blocks, which each of the data blocks is 0.25 M, sent to other five OSDs by OSD1, in total is 2.25 M. But the actual data stored in the OSDs is 1.5 M, resulting in a waste of CPU and network bandwidth, which affects storage performance.

Based on this, a new open-source distributed storage system called Distributed Asynchronous Object Storage (DAOS) has emerged, which calculates EC checksum data at the client component end and then transmits data through RDMA at the storage end.

Taking the 4+2 EC scheme as an example, the DAOS architecture performs EC calculations in the client component and stores the multiple data blocks obtained after EC dividing into the corresponding OSDs respectively.

The architecture of open-source DAOS is similar to that of Ceph, as both scatter data directly to the OSD layer at the client component end (i.e., first dividing the data and then sending these data blocks to different OSDs). This architecture is not very supportive to small I/O for EC (where the volume of written data indicated in a write request is less than a preset threshold): due to the need to read the original data to recalculate checksum data for small EC I/O, the performance for small I/O in this architecture is poor; besides, small object data cannot fully utilize the space of the stripe, leading to severe space waste and increased user costs; and support for features such as snapshots, deduplication, and compression is very difficult.

To address the issues of small EC I/O and small objects, related technologies have proposed an architectural solution based on redirect on write (ROW) for small I/O aggregation and full stripe writes.

This architecture adds a virtual node layer (VNODE) in storage nodes. In response to determining a small I/O write request is received, the written data indicated by the small I/O write request may be sent to the virtual node layer, where multiple small I/Os are re-aggregated into a large block of data, and then EC checksum data for this large block of data is calculated and written as EC data in the form of a full stripe.

It is easy to understand that although this architecture is very supportive to small I/O by aggregating small I/Os into large blocks of data for full stripe writes, it is not supportive to the performance of large IO. In this architecture, to ensure data consistency, both small I/O and large I/O need to be sent to the virtual node layer for EC calculations and subsequent EC dividing. However, large I/O does not need to be aggregated in the virtual node layer, and the process of sending large I/O to the virtual node layer results in greater data transmission volume.

Based on this, the present disclosure proposes a method for data writing in a distributed storage system to address the issue of excessive data transmission volume for large I/O based on the aforementioned ROW-based architecture for small I/O aggregation and full stripe writes.

Figure 1:
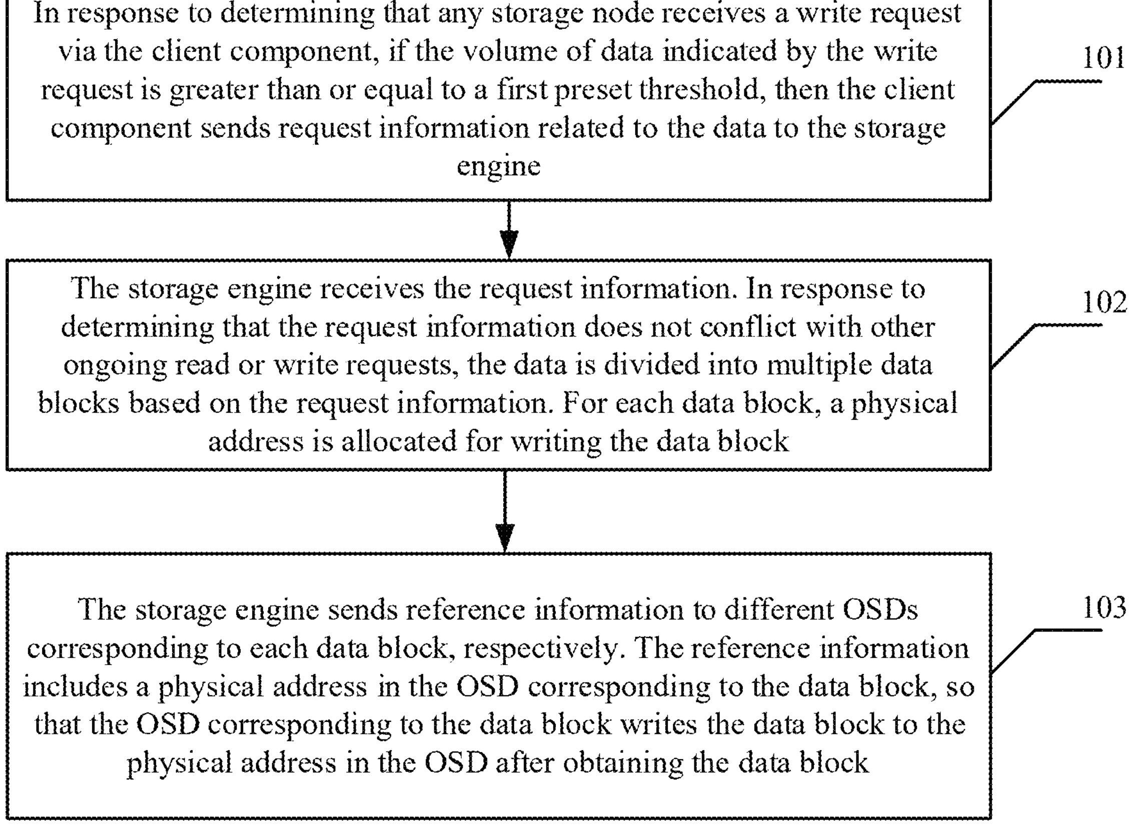
FIG. 1 is a schematic diagram of a method for data writing in a distributed storage system provided in an example of the present disclosure.

Please refer to FIG. 1, which is a schematic diagram of a method for data writing in a distributed storage system provided by an example of the present disclosure.

In this example, the method is applied in a distributed storage system. The architecture of the distributed storage system proposed by the present disclosure is similar to the architecture based on ROW for small I/O aggregation and full stripe writing mentioned above. The distributed storage system proposed by the present disclosure includes one or more storage nodes and one or more OSDs, and each storage node is configured with a client component and a storage engine. The method illustrated in FIG. 1 can be performed by any one node in the distributed storage system.

For small I/O requests, the processing method of the storage node of the distributed storage system proposed by the present disclosure is similar to the processing method in the architecture based on ROW for small I/O aggregation and full stripe writing, that is, if the user data is small I/O or non-full stripe, it will be aggregated to a full stripe in the storage engine before being written into the OSD.

For large I/O requests, as shown in FIG. 1, the method includes the following processes.

In process 101, in response to determining that any storage node receives a write request via the client component, if the volume of data indicated by the write request is greater than or equal to a first preset threshold, then the client component sends request information related to the data to the storage engine.

In this example, in response to determining that any storage node receives a write request via the client component, the storage node may first detect the volume of data indicated by the write request to determine the write request being a small I/O request or a large I/O request.

In some examples, the write request may be determined to be a small I/O request or a large I/O request based on the relationship between the volume of the data indicated by the write request and the first preset threshold. In response to determining the volume of the data indicated by the write request is greater than or equal to the first preset threshold, it indicates that the write request is a large I/O request. In response to determining the volume of the data indicated by the write request is less than the first preset threshold, it indicates that the write request is a small I/O request.

As an example, the first preset threshold refers to the data volume corresponding to the full stripe size preset for a set of stripes obtained after the OSDs comprised in the storage node are divided.

In this example, data may be divided into multiple stripes, and each stripe is usually composed of multiple data blocks. These stripes are allocated to different OSDs for storage. "Full stripe" means that when writing data, all data blocks in each stripe are filled as much as possible to improve storage efficiency. Wherein the data volume corresponding to the full stripe size may be a first preset threshold preset by the user, and the present disclosure does not impose restrictions on this.

For example, in a storage system, if the full stripe size is preset to 16 KB, and each stripe is divided into 4 stripe chunks stored across 4 OSDs, then when storing data of a full stripe size, each stripe chunk will be 4 KB in size, meaning each OSD stores 4 KB of data. In other words, the stripe size per OSD is 4 KB, and the configured full stripe size is calculated as 4 KB×4 OSDs=16 KB. Here, the first preset threshold corresponds to the configured full stripe size, which in this example is 16 KB.

In this example, in response to determining that any storage node receives a write request via the client component, the storage node may also store the written data into a corresponding memory address in the client component.

In this example, after determining that the write request is a large I/O request, the client component sends request information related to the written data to the storage engine.

As an example, the request information may include I/O object information, I/O size, I/O offset corresponding to the write request, and the corresponding memory address in the client component, etc.

Wherein the I/O object information refers to an identifier or metadata of an object to which data is to be written, including the name, ID, path of the object, etc. Through the I/O object information, the storage system may determine which specific object the data is written to and ensure that the object may be found accurately in a subsequent read request.

The I/O size refers to the volume of the data to be written. The I/O size determines how to allocate storage space, how to optimize data transmission, and how to handle issues such as data block dividing and merging.

The I/O offset refers to the byte offset relative to the starting position inside a target I/O object, specifying the write position of the data in the object and indicating where the storage system should start writing new data.

The corresponding memory address in the client component refers to a specific storage location of the written data in the client memory, which is to indicate that the storage system should obtain the written data from this memory address.

It should be noted that the client component only sends request information with a small data volume, which is a few dozen bits, to the storage engine, and does not send the written data to the storage engine.

So far, the description of process 101 is concluded, and process 102 will be executed next.

In process 102, the storage engine receives the request information. In response to determining that the request information does not conflict with other ongoing read or write requests, the data is divided into multiple data blocks based on the request information. For each data block, a physical address is allocated for writing the data block.

In this example, in response to determining the storage engine receives the request information, the storage engine first performs an I/O mutual exclusion, which means determining that the write request does not occupy a same resource as other ongoing read or write requests. In response to determining that the write request needs to occupy the same resource as other ongoing read or write requests, then the storage engine must wait until the resource is freed by other ongoing requests before using the resource.

After performing the I/O mutual exclusion, the data may be divided into multiple data blocks based on the request information. For each data block, a physical address is allocated for writing that data block.

In this example, the written data may be divided into multiple data blocks based on the request information sent in process 101, so that the multiple data blocks may be stored in different OSDs, respectively. Furthermore, for each data block, a physical address may be allocated for writing the data block, i.e., the physical address in the OSD. Since the written data does not pass through the storage engine actually, the division of the written data by the storage engine means a division in size.

In this example, the storage engine may include a ROW module, a cache module, a garbage collection (GC) module, a database (DB) module, and a PClient module.

In some examples, the core of the storage engine is for data aggregation redirect-on-write (ROW), so its internal core module is the ROW module.

For overwrite scenarios, after data redirection, the original aggregated object will generate garbage data, so a GC module is required for garbage collection.

In addition, after data redirection, metadata for the redirection needs to be recorded, so a DB module is required for reading and writing metadata.

Data aggregation will consume some time, and in order to ensure the latency of a write I/O returning to the host, a cache module is also required for caching small I/Os.

At last, each of the above modules may directly read from and write into OSDs, so a persistent layer client PClient module is required to issue commands to OSDs.

The description above concludes process 102. Then, proceed to process 103.

In process 103, the storage engine sends reference information to different OSDs corresponding to each data block, respectively. The reference information includes a physical address (i.e., physical write address) in the OSD corresponding to the data block, so that the OSD corresponding to the data block writes the data block to the physical address in the OSD after obtaining the data block.

In this example, the storage engine may send the physical address in the OSD allocated for each data block in process 102 to the corresponding OSD. For the OSD corresponding to each data block, after receiving the physical address allocated for the data block, the OSD may write the data block to the corresponding physical address after obtaining the data block.

As an example, for each data block, the storage engine may also send the memory address of the data block in the client component to the corresponding OSD of the data block, and there is a network connection between the client component and the corresponding OSD of each data block. The specific method for the OSD corresponding to the data block to write the data block to the corresponding physical address may include the following.

Through the network connection between the client component and the OSD corresponding to the data block, the OSD corresponding to the data block obtains the data block from the client component based on the memory address of the data block in the client component and writes the data block to the physical address in the OSD corresponding to the data block.

In this example, the OSD may directly obtain the data block from the client component based on the memory address of the data block in the client component and further store the data block to the physical address in the OSD corresponding to the data block.

As an example, the network connection between the client component and the corresponding OSD of each data block may be an RDMA connection.

In some examples, the OSD first locally applies for a physical address to receive data, and then uses the RDMA READ technology to directly write the data block from the client component to the physical address for receiving data, through the memory address of the corresponding data block in the client component provided from the upper layer.

The description above concludes the description of process 103.

In this example, the above operations may not only be performed on written data, but also on methods capable of data protection and recovery in some distributed storage systems, such as using Erasure Coding (EC) to fragment data and determine corresponding checksum data. The aforementioned writing method may also be utilized for these purposes.

As an example, before the client component sends request information related to the data to the storage engine, the client component may determine the checksum data corresponding to the written data according to the write request.

The checksum data is treated as written data, and is written to the physical address in the OSD corresponding to the checksum data.

In this example, the client component may determine the checksum data corresponding to the written data, and apply for a checksum data memory address for the checksum data in the client component.

Furthermore, the memory address of the checksum data in the client component may be sent to the storage engine. Upon receiving the memory address of the checksum data, the storage engine will also divide the checksum data into multiple checksum data blocks and allocate corresponding OSD physical addresses for each checksum data block.

The storage engine then sends the memory addresses of the checksum data blocks in the client component and the physical addresses of the OSDs corresponding to each checksum data block to the respective OSDs, enabling the OSDs to store the checksum data to the corresponding physical addresses in the OSDs through the network connections between the client component and the OSDs.

In this example, after the writing is completed, the storage engine may also update metadata corresponding to target data (i.e., the original data to be written). The metadata corresponding to the target data is to record the correspondence between the target data and the physical addresses in the OSDs of multiple written data blocks into which the target data is divided.

Below, the data reading process is introduced.

As an example, in response to determining any storage node receives a read request via the client component, in response to determining that the volume of read data indicated by the read request is greater than or equal to a second preset threshold and no OSD failure is identified, the client component allocates an RDMA memory address of each data block of the read data indicated by the read request.

The client component then sends read request information related to the read data to the storage engine.

The storage engine, upon determining that the read request information does not conflict with other ongoing read or write requests, identifies the physical addresses in the OSDs where the multiple written data blocks into which the target data was divided during writing are stored. In some examples, the read request information may include I/O object information, I/O size, I/O offset, memory address, etc., totaling a few dozen bits and may be ignored.

The storage engine sends reading information to each OSD corresponding to the data blocks. The reading information includes the physical addresses (physical read addresses) of the multiple written data blocks in the OSDs and the RDMA memory addresses of the multiple written data blocks in the client component, enabling each OSD corresponding to each written data block to read out the corresponding written data block based on its target physical address in the OSD and store the written data block to the corresponding RDMA memory address in the client component through the RDMA connection between the client component and the OSD.

In this example, in response to determining there is no OSD failure, the reading process is the reverse of the writing process and will not be elaborated here. The following describes normal reading scenarios in conjunction with specific examples.

As an example, in response to determining that any storage node receives a read request via the client component, in response to determining that the volume of target data (i.e., the written data) indicated by the read request is greater than or equal to a second preset threshold and an OSD failure is identified, the client component allocates an RDMA memory address of each read block of the target data and a memory address for storing the checksum data corresponding to the target data.

The client component then sends read request information related to the target data to the storage engine.

The storage engine, upon determining that the read request information does not conflict with other ongoing read or write requests, identifies the physical addresses in the OSDs where the multiple written data blocks into which the target data was divided during writing are stored, as well as the physical address in an OSD where the checksum data corresponding to the target data is written.

The storage engine sends reading information to each OSD corresponding to the written data blocks. The reading information includes the physical addresses of the multiple written data blocks in the OSDs, the RDMA memory addresses of the multiple written data blocks in the client component, the physical address in the OSD where the checksum data corresponding to the target data is written, and the memory address in the client component for storing the checksum data corresponding to the target data. This enables each OSD corresponding to a written data block to read out the written data block based on its target physical address in the OSD and store the written data block to the corresponding RDMA memory address in the client component through the RDMA connection between the client component and the OSD. Besides, based on the physical address in an OSD where the checksum data corresponding to the target data is written, the OSD reads out the checksum data and stores the checksum data to the memory address in the client component for storing the checksum data corresponding to the target data.

The data corresponding to the failed OSD is then recovered based on the checksum data corresponding to the target data and the read-out written data blocks.

In this example, a data reading method is proposed for scenarios where an OSD failure occurs.

It should be noted that the size of the read checksum data may be determined based on the size of the data stored in the failed OSD. For example, in response to determining that the size of the data stored in the failed OSD is 0.25 M, the size of the read checksum data should be greater than or equal to 0.25 M.

The method will be described in conjunction with specific examples in the following text, and will not be elaborated here.

In the present disclosure, the specific method for determining the physical addresses in OSDs where multiple written data blocks, into which target data is divided during writing, are written may include the following.

Based on metadata corresponding to the target data, the physical addresses in OSDs where the multiple written data blocks, into which the target data is divided during writing, are written are determined.

At this point, the description of the data writing method in the distributed storage system in FIG. 1 ends.

In the present disclosure, in response to determining that any storage node receives a write request with a large volume of data through a client component, the storage node sends request information related to the data but with an small data volume to the storage engine via the client component, so that the storage engine may divide the data into multiple data blocks and allocate a physical address in an OSD for writing each data block, thereby enabling the OSD corresponding to each data block to write the data block to its physical address in the OSD after obtaining the data block. Besides, the written data does not pass through the storage engine, reducing the data transmission volume during the writing process and minimizing bandwidth waste a lot.

The data writing method in the distributed storage system proposed in the present disclosure is described below through three specific examples.

An example is described as follows.

Please refer to FIG. 2, which is a schematic diagram of large I/O direct write provided in an example of the present disclosure.

Based on the scenario shown in FIG. 2, the specific process of this method is as follows.

In process 201, in response to determining that the client component determines that a write request, e.g., a large I/O write request over 512 KB, is received, the client component calculates the checksum data, which is 0.5 M, corresponding to the written data (i.e., to be written into OSDs) indicated by the write request, where the written data is IM, and applies for corresponding memory addresses for the written data and the checksum data, respectively.

The client component sends request information, which may include I/O object information, I/O size, I/O offset, memory address, etc., totaling a few dozen bits which may be ignored, to the storage engine, where the memory addresses include those for the written data and the checksum data.

In process 202, the storage engine performs I/O mutual exclusion, divides the written data and the checksum data into data blocks, and allocates memory addresses in the OSD1-OSD6 for the written data and the checksum data, wherein each data block is 0.25 M.

The storage engine sends the memory address of each data block in the client component and its physical address in an OSD to the OSD, which is a few dozen bits in total and may be ignored.

In process 203, each of OSD1-OSD6 transfers data to its physical address using RDMA READ technology through an RDMA connection with the client component, wherein each data block is 0.25 M, i.e., the data is 1 M and the checksum data is 0.5 M.

After storing the data to its corresponding physical address, each of OSD1-OSD6 returns to the storage engine. The storage engine then updates first metadata of the written data.

After the request returns to the client component, the request returns to the host, and the large I/O direct write is completed.

It may be seen that the total data transmission volume for writing 1.5 M of data using the above large I/O direct write method is also approximately 1.5 M, greatly reducing data resource waste.

At this point, the description of the large I/O direct write in FIG. 2 ends.

Another example is described as follows.

Figure 3:
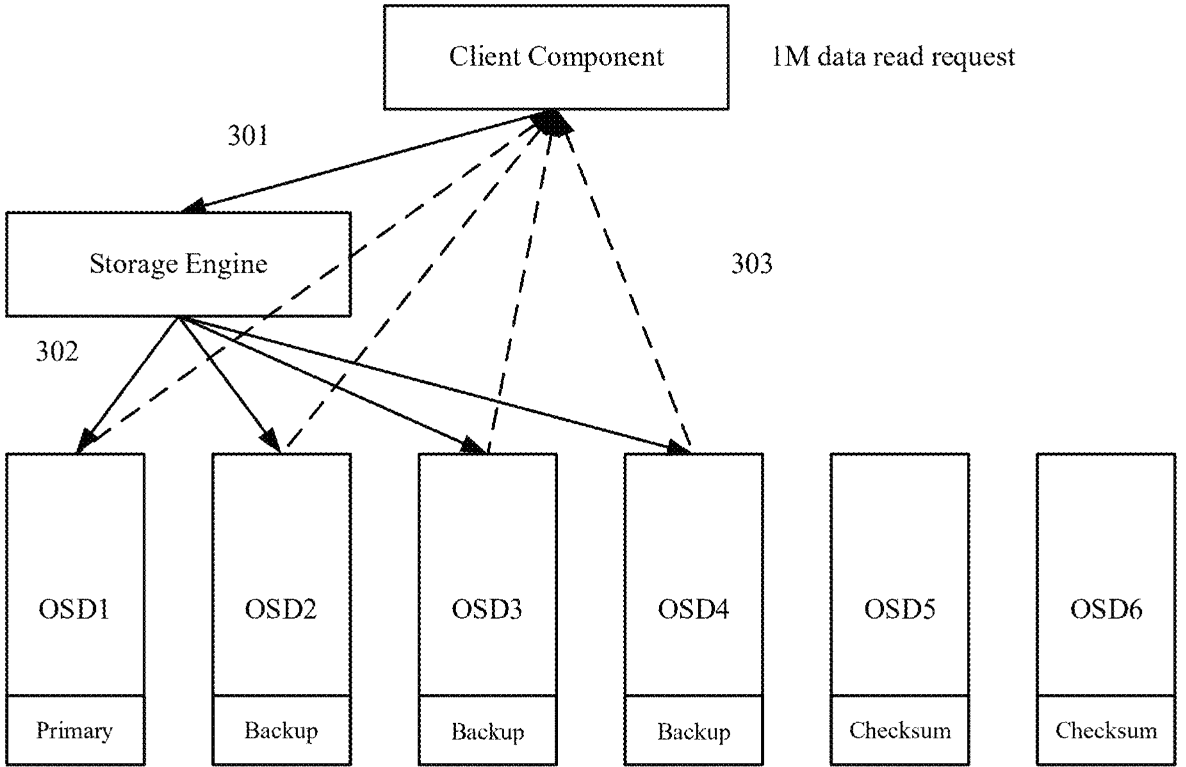
FIG. 3 is a schematic diagram of direct large I/O read provided in an example of the present disclosure.

Please refer to FIG. 3, which is a schematic diagram of large I/O direct read provided in an example of the present disclosure.

As shown in FIG. 3, the specific process of this method is as follows.

In process 301, in response to determining that the client component receives a read request, e.g., a large I/O read request over 64 KB, after confirming that there are no abnormal OSDs, the client component applies for a corresponding RDMA address for each read data block of read data (i.e., the data which was written into OSDs and is to be read) indicated by the read request, where the read data is 1 M. Wherein the read request does not require data aggregation, so there are no restrictions on the size of direct I/O, which is based on the more efficient size of RDMA; meanwhile, the read request does not require calculating the checksum data and do not require full stripes.

The client component sends request information, which may include I/O object information, I/O size, I/O offset, memory address, etc., totaling a few dozen bits and may be ignored, to the storage engine.

In process 302, the storage engine performs the I/O mutual exclusion and queries metadata based on I/O object information to confirm physical addresses of each read data block of the read data in OSD1-OSD4. As described above for the write request, after the writing of the written data was completed, the metadata indicating a correspondence between the written data and the physical addresses of each written data block in OSDs may be updated by the storage engine. Therefore, subsequently, when a read request is receives, the physical addresses of each read data block of the data to be read in OSDs may be queried based on the metadata. The storage engine allocates an RDMA memory address of each read data block.

The storage engine sends the physical addresses of the read data in the OSD1-OSD4 and the corresponding RDMA addresses of the read data to OSD1-OSD4, respectively.

In process 303, each of OSD1-OSD4 transfers data to the RDMA address using RDMA READ technology through an RDMA connection with the client component wherein each data block is 0.25 M, and the read data is IM in total.

After the request returns to the client component, the request returns to the host, and the large I/O direct read is completed.

It may be seen that the total data transmission volume for reading IM of data using the above large I/O direct read method is also about 1 M, reducing data resource waste a lot.

At this point, the description of the large I/O direct read in FIG. 3 ends.

Here is another example.

Figure 4:
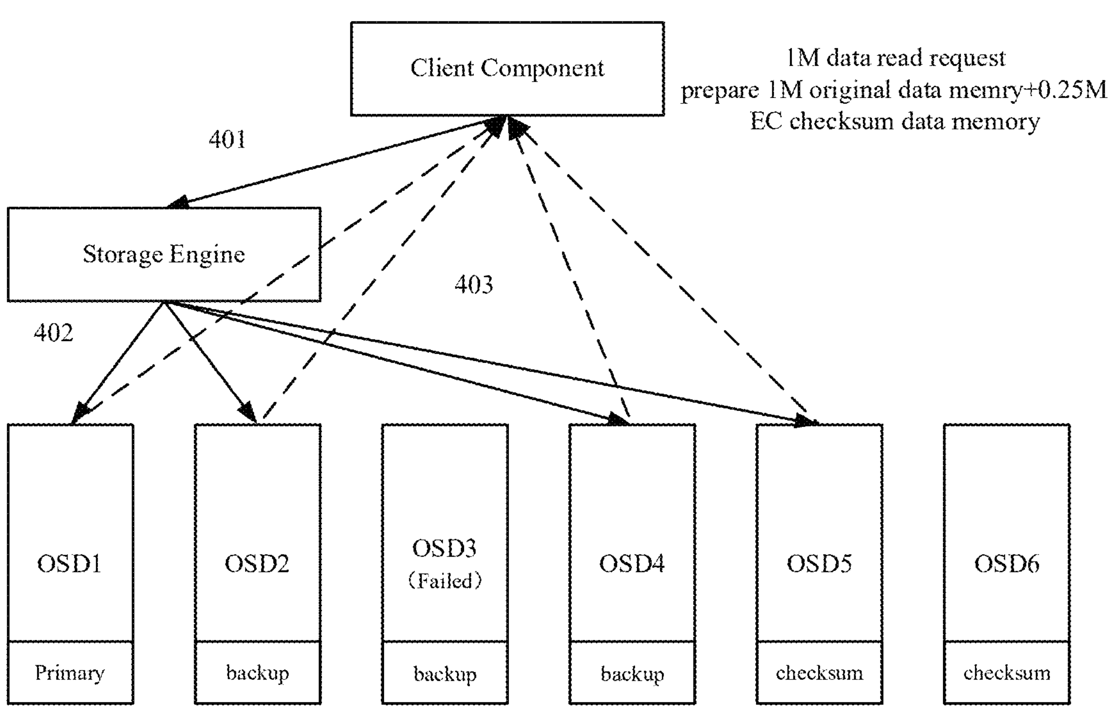
FIG. 4 is a schematic diagram of direct degraded read for large I/O provided in an example of the present disclosure.

Please refer to FIG. 4, which is a schematic diagram of large I/O degraded read provided in an example of the present disclosure.

Based on the scenario in FIG. 4, the specific process of this method is as follows.

In process 401, in response to determining that the client component receives a read request, e.g., a large I/O read request over 64 KB, after confirming the presence of a failed OSD (OSD3), the client component applies for a corresponding RDMA address for each read data block of read data (i.e., the data which was written into OSDs and is to be read) indicated by the read request, where the read data is IM and 0.25 M of the IM is unreadable due to OSD3, and a corresponding checksum data memory address for the checksum data, which is 0.25 M.

The client component sends request information (I/O object information, I/O size, I/O offset, memory address, etc., totaling a few dozen bits, which may be ignored) to the storage engine.

In process 402, the storage engine performs the I/O mutual exclusion and queries the metadata based on the I/O object information to confirm the physical addresses of each data block of the read data in OSD1, OSD2 and OSD4, the physical address of the checksum data in OSD5, and the checksum data memory address for the checksum data in the client component.

The storage engine sends the physical addresses of the read data in the OSD1, OSD2 and OSD4, the corresponding RDMA addresses of the read data, the physical address of the checksum data in the OSD5, and the checksum data memory address to the corresponding OSDs.

In process 403, each of OSD1, OSD2 and OSD4 transfers data to the RDMA address using RDMA READ technology through an RDMA connection with the client component, the data transferred by OSD1, OSD2, and OSD4 is 0.75 M in total, and OSD5 transfers the checksum data to the corresponding checksum data memory address, which is 0.25 M. The data volume transferred by each OSD is 0.25 M.

After the request returns to the client component, the client component uses the checksum data and the data read from the RDMA address to calculate and recover the data from OSD3, the request returns to the host, and the large I/O degraded read is completed.

It may be seen that the total data transmission volume for reading IM of data using the above large I/O degraded read method is also about 1 M, reducing data resource waste a lot.

At this point, the description of the large I/O degraded read in FIG. 4 ends.

Figure 5:
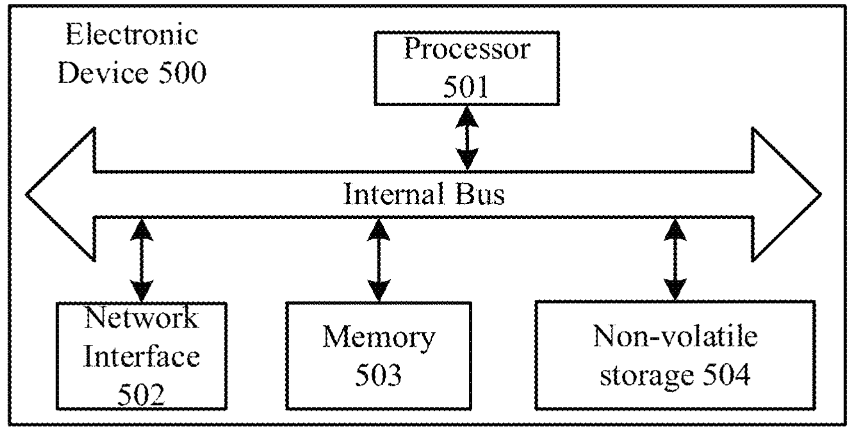
FIG. 5 is a structural schematic diagram of an electronic device provided in an example of the present disclosure.

Please refer to FIG. 5, which illustrates a schematic diagram of an electronic device 500 proposed in an example of the present disclosure. At the hardware level, the electronic device includes a processor 501, an internal bus, a network interface 502, memory 503, and non-volatile storage 504, and may also include other hardware required for other services. The processor reads corresponding computer programs from the non-volatile storage into the memory and then executes them, forming a terminal interaction apparatus at the logical level. Of course, in addition to software example, the present disclosure does not exclude other example methods, such as logical apparatuses or a combination of software and hardware, etc. That is to say, the execution entity of the following processing flow is not limited to various logical units, but may also be hardware or logical apparatuses.

Figure 6:
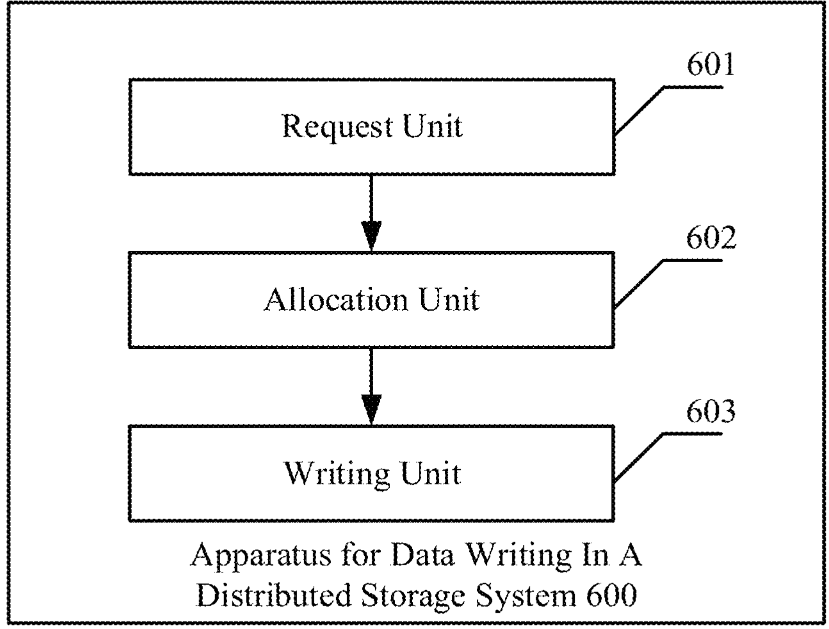
FIG. 6 is a structural diagram of an apparatus for data writing in a distributed storage system provided in an example of the present disclosure.

Please refer to FIG. 6, which illustrates a schematic diagram of an apparatus 600 for data writing in a distributed storage system proposed in an example of the present disclosure. The distributed storage system includes one or more storage nodes and one or more Object-based Storage Devices (OSDs); each storage node is equipped with a client component and a storage engine. As shown in FIG. 6, the apparatus for data writing in the distributed storage system may include a request unit 601, an allocation unit 602, and a writing unit 603. In some examples, the apparatus includes the following.

The request unit 601 is for, in response to determining that any storage node receives a write request via a client component of the storage node, upon a data volume of data required to be written as indicated by the write request being greater than or equal to a first preset threshold, sending write request information related to the written data to a storage engine of the storage node via the client component.

The allocation unit 602 is for receiving the write request information via the storage engine, and based on the write request information, dividing the written data into multiple written data blocks in response to determining that the write request information does not conflict with other ongoing read or write requests; allocating, to each written data block, a physical write address in an OSD allocated to the written data block.

The writing unit 603 is for sending reference information of each written data block to each OSD corresponding to each written data block via the storage engine, where the reference information of each written data block comprises the physical write address in the OSD corresponding to the written data block, so that the OSD corresponding to each written data block writes the written data block to the physical write address in the OSD corresponding to the written data block after obtaining the written data block.

In some examples, the reference information of each written data block further includes a memory address in the client component, and a network connection exists between the client component and the OSD allocated to each written data block; the writing unit 603 is for:

through the network connection between the client component and the OSD corresponding to each written data block, obtaining, by the OSD corresponding to each written data block, the corresponding written data block from the client component based on the memory address of the corresponding written data block in the client component and writing the corresponding written data block to the corresponding physical write address.

In some examples, the network connection between the client component and the OSD allocated to each written data block is an RDMA connection.

In some examples, the first preset threshold refers to a data volume corresponding to a full stripe size preset for a set of stripes obtained after the OSDs corresponding to the storage node are divided.

In some examples, the request unit 601 is further for:

before sending the write request information related to the written data to the storage engine via the client component, determining checksum data corresponding to the written data based on the write request;

designating the checksum data as written data, and writing the checksum data to a physical write address in an OSD allocated to the checksum data.

In some examples, the writing unit 603 is further for:

in response to determining that any storage node receives a read request via the client component, upon that a volume of read data indicated by the read request is greater than or equal to a second preset threshold and no OSD failure is identified, allocating an RDMA memory address of each read data block of the read data via the client component;

sending read request information related to the read data to the storage engine via the client component;

through the storage engine, determining a physical read address in an OSD where each corresponding read data block of the read data was written, in response to determining the read data was written, and that the read request information does not conflict with other ongoing read or write requests;

sending reading information to each OSD corresponding to each read data block through the storage engine, where the reading information includes the physical read address in each OSD where each corresponding read data block was written and the RDMA memory address of each read data block in the client component, so that each OSD corresponding to each read data block reads out the data block based on the physical read address in the OSD where the corresponding data block was written through the RDMA connection between the client component and the OSD corresponding to the data block, and stores the read-out data block at the corresponding RDMA memory address of the read-out data block in the client component.

In some examples, the writing unit 603 is further for:

in response to determining that any storage node receives a read request via the client component, upon that a volume of the read data indicated by the read request is greater than or equal to a second preset threshold and an OSD failure is identified, allocating an RDMA memory address of each read data block of the read data indicated by the read request and a memory address for storing a checksum data corresponding to the read data via the client component;

sending read request information related to the read data to the storage engine via the client component;

through the storage engine, determining a physical read address in an OSD where each corresponding read data block of the read data was written, and a physical read address in an OSD where the checksum data corresponding to the read data was written, in response to determining the read data was written and that the read request information does not conflict with other ongoing read or write requests;

sending reading information to each OSD corresponding to each read data block of the read data through the storage engine, where the reading information includes the physical read address in each OSD where each corresponding read data block of the read data was written, the RDMA memory address of each read data block of the read data in the client component, the physical read address in the OSD where the checksum data corresponding to the read data was written, and the memory address in the client component for storing the checksum data corresponding to the read data, so that each OSD corresponding to each data block of the read data reads out the data block based on the physical read address of the read data block in the OSD where the read data block was written through the RDMA connection between the client component and the OSD corresponding to the read data block, and stores the read-out data block at the corresponding RDMA memory address of the read-out data block in the client component; and the OSD corresponding to the checksum data reads out the checksum data based on the physical read address in the OSD where the checksum data was written, and stores the checksum data at the corresponding memory address in the client component;

recovering data corresponding to the failed OSD based on the checksum data corresponding to the read data and each read-out data block.

In some examples, after writing the multiple written data blocks of the written data indicated by the write request to the physical addresses in the OSDs corresponding to the written data blocks, the writing unit 603 is for:

updating the metadata corresponding to the written data by the storage engine, where the metadata corresponding to the written data is for recording a correspondence between the written data and the physical write addresses in the OSDs corresponding to the multiple written data blocks obtained by dividing the written data.

The writing unit 603 is for: determining the physical read addresses in the OSDs where the corresponding data blocks of the read data were written in response to determining the read was written based on the metadata corresponding to the read data.

This completes the description of the data writing apparatus in the distributed storage system in FIG. 6.

Correspondingly, in this example, the present disclosure further provides a computer-readable storage medium, where a plurality of computer instructions are stored on the computer-readable storage medium. In response to determining the computer instructions are executed, the method disclosed in the above examples of the present disclosure may be implemented.

Illustratively, the computer-readable storage medium may be any electronic, magnetic, optical, or other physical storage apparatus capable of containing or storing information, such as executable instructions, data, etc. For example, the computer-readable storage medium may be: RAM (Random Access Memory), volatile memory, non-volatile memory, flash memory, storage drives (such as hard disk drives), solid-state drives, any type of storage disk (such as optical disks, DVDs, etc.), or similar storage media, or combinations thereof.

The above are merely preferred examples of the present disclosure and are not intended to limit the present disclosure. For those skilled in the art, the present disclosure may be subject to various modifications and variations. Any modifications, equivalent substitutions, improvements, etc. made within the spirit and principles of the present disclosure should be included within the scope of protection of the present disclosure.

What is claimed is:

1. A method for data writing in a distributed storage system, wherein the method is applied to a storage node configured with a client component and a storage engine, the method comprising:

receiving a write request via the client component;

upon determining that a volume of written data indicated by the write request is greater than or equal to a first preset threshold, sending write request information related to the written data to the storage engine via the client component;

receiving the write request information via the storage engine;

dividing the written data into a plurality of written data blocks in response to determining that no ongoing read or write request conflicts with the write request information; allocating different Object-based Storage Devices (OSDs) to the plurality of data blocks, respectively and allocating, to each data block, a physical write address in an OSD allocated to the data block;

sending reference information of each written data block to each OSD allocated to each written data block via the storage engine, wherein the reference information of each written data block comprises the physical write address in the OSD allocated to the written data block, so that each written data block is to be obtained by the OSD allocated to each written data block and written to the physical write address allocated to each written data block.

2. The method of claim 1, wherein the reference information of each written data block further comprises a memory address in the client component for storing the written data block;

a network connection exists between the client component and the OSD allocated to each written data block; and the each written data block is to be obtained by the OSD allocated to each written data block and written to the physical write address allocated to each written data block comprising:

via the network connection between the client component and the OSD corresponding to each written data block, obtaining, by the OSD corresponding to each written data block, the corresponding written data block from the client component based on the memory address of the corresponding written data block in the client component, and writing the corresponding written data block to the corresponding physical write address.

3. The method of claim 2, wherein the network connection between the client component and the OSD allocated to each written data block is a remote direct memory access (RDMA) connection.

4. The method of claim 3, wherein the method further comprises:

determining first checksum data corresponding to the written data, prior to sending the write request information related to the written data to the storage engine via the client component;

designating the first checksum data as written data, and writing the first checksum data to a physical write address in an OSD allocated to the first checksum data.

5. The method of claim 4, wherein the method further comprises:

receiving a read request via the client component;

allocating, via the client component, an RDMA memory address of each read data block of read data indicated by the read request and a memory address for storing a second checksum data corresponding to the read data, in response to determining that a volume of the read data indicated by the read request is greater than or equal to a second preset threshold and an OSD failure is identified;

sending read request information related to the read data to the storage engine via the client component;

determining, via the storage engine, a physical read address in an OSD corresponding to each read data block of the read data and a physical read address in an OSD corresponding to the second checksum data, in response to determining that no other ongoing read or write request conflicts with the read request information;

sending reading information to each OSD corresponding to each read data block via the storage engine, wherein the reading information comprises the physical read address in each OSD corresponding to each read data block, the RDMA memory address of each read data block in the client component, the physical read address in the OSD corresponding to the second checksum data and the memory address in the client component for storing the second checksum data, so that each OSD corresponding to each read data block reads out the read data block based on the physical read address of the read data block via the RDMA connection between the client component and the OSD corresponding to the read data block, and stores the read data block at the corresponding RDMA memory address of the read data block in the client component; and, the OSD corresponding to the second checksum data reads out the second checksum data based on the physical read address in the OSD corresponding to the second checksum data, and stores the second checksum data at the corresponding memory address in the client component;

recovering data corresponding to the failed OSD based on the second checksum data and each read data block being read out.

6. The method of claim 3, wherein the method further comprises:

updating first metadata corresponding to the written data by the storage engine; wherein the first metadata is to record a correspondence between the written data and the physical write addresses of each written data block.

7. The method of claim 3, wherein the method further comprises:

receiving a read request via the client component; upon determining that a volume of read data indicated by the read request is greater than or equal to a second preset threshold, and no OSD failure is identified, allocating, via the client component, an RDMA memory address of each read data block of the read data;

sending read request information related to the read data to the storage engine via the client component;

determining, via the storage engine, a physical read address in an OSD corresponding to each read data block of the read data, in response to determining that no other ongoing read or write request conflicts with the read request information;

sending reading information to each OSD corresponding to each read data block via the storage engine, wherein the reading information comprises the physical read address in each OSD corresponding to each read data block and the RDMA memory address of each read data block in the client component, so that each OSD corresponding to each read data block reads out the read data block based on the physical read address in the OSD corresponding to the read data block via the RDMA connection between the client component and the OSD corresponding to the read data block, and stores the read data block at the corresponding RDMA memory address of the read data block in the client component.

8. The method of claim 7, wherein, the determining, via the storage engine, the physical read address in the OSD corresponding to each read data block of the read data comprises:

determining, based on second metadata corresponding to the read data, the physical read addresses of each read data block of the read data.

9. The method of claim 1, wherein the first preset threshold refers to a data volume corresponding to a full stripe size preset for a set of stripes obtained after the OSDs comprised in the storage node are divided.

10. An electronic device in a distributed storage system, wherein the distributed storage system comprises one or more storage nodes and one or more Object-based Storage Devices (OSDs), each storage node being configured with a client component and a storage engine, and the electronic device comprises: a processor and a non-transitory machine-readable storage medium for storing computer instructions, wherein the computer instructions are executed by the processor to perform operations comprising:

receiving a write request via a client component of any storage node;

upon determining that a volume of written data indicated by the write request is greater than or equal to a first preset threshold, sending write request information related to the written data to a storage engine of the storage node via the client component;

receiving the write request information via the storage engine;

dividing the written data into a plurality of written data blocks in response to determining that no ongoing read or write request conflicts with the write request information; allocating different Object-based Storage Devices (OSDs) to the plurality of data blocks, respectively and allocating, to each data block, a physical write address in an OSD allocated to the data block;

sending reference information of each written data block to each OSD allocated to each written data block via the storage engine, wherein the reference information of each written data block comprises the physical write address in the OSD allocated to the written data block, so that each written data block is to be obtained by the OSD allocated to each written data block and written to the physical write address allocated to each written data block.

11. The electronic device of claim 10, wherein the reference information of each written data block further comprises a memory address in the client component for storing the written data block;

a network connection exists between the client component and the OSD allocated to each written data block; and the each written data block is to be obtained by the OSD allocated to each written data block and written to the physical write address allocated to each written data block comprising:

via the network connection between the client component and the OSD corresponding to each written data block, obtaining, by the OSD corresponding to each written data block, the corresponding written data block from the client component based on the memory address of the corresponding written data block in the client component, and writing the corresponding written data block to the corresponding physical write address.

12. The electronic device of claim 11, wherein the network connection between the client component and the OSD allocated to each written data block is a remote direct memory access (RDMA) connection.

13. The electronic device of claim 12, wherein the operations further comprise:

determining first checksum data corresponding to the written data, prior to sending the write request information related to the written data to the storage engine via the client component;

designating the first checksum data as written data, and writing the first checksum data to a physical write address in an OSD allocated to the first checksum data.

14. The electronic device of claim 13, wherein the operations further comprise:

receiving a read request via the client component;

allocating, via the client component, an RDMA memory address of each read data block of read data indicated by the read request and a memory address for storing a second checksum data corresponding to the read data, in response to determining that a volume of the read data indicated by the read request is greater than or equal to a second preset threshold and an OSD failure is identified;

sending read request information related to the read data to the storage engine via the client component;

determining, via the storage engine, a physical read address in an OSD corresponding to each read data block of the read data and a physical read address in an OSD corresponding to the second checksum data, in response to determining that no other ongoing read or write request conflicts with the read request information;

sending reading information to each OSD corresponding to each read data block via the storage engine, wherein the reading information comprises the physical read address in each OSD corresponding to each read data block, the RDMA memory address of each read data block in the client component, the physical read address in the OSD corresponding to the second checksum data and the memory address in the client component for storing the second checksum data, so that each OSD corresponding to each read data block reads out the read data block based on the physical read address of the read data block via the RDMA connection between the client component and the OSD corresponding to the read data block, and stores the read data block at the corresponding RDMA memory address of the read data block in the client component; and, the OSD corresponding to the second checksum data reads out the second checksum data based on the physical read address in the OSD corresponding to the second checksum data, and stores the second checksum data at the corresponding memory address in the client component;

recovering data corresponding to the failed OSD based on the second checksum data and each read data block being read out.

15. The electronic device of claim 12, wherein the operations further comprise:

updating first metadata corresponding to the written data by the storage engine; wherein the first metadata is to record a correspondence between the written data and the physical write addresses of each written data block.

16. The electronic device of claim 12, wherein the operations further comprise:

receiving a read request via the client component; upon determining that a volume of read data indicated by the read request is greater than or equal to a second preset threshold, and no OSD failure is identified, allocating, via the client component, an RDMA memory address of each read data block of the read data;

sending read request information related to the read data to the storage engine via the client component;

determining, via the storage engine, a physical read address in an OSD corresponding to each read data block of the read data, in response to determining that no other ongoing read or write request conflicts with the read request information;

sending reading information to each OSD corresponding to each read data block via the storage engine, wherein the reading information comprises the physical read address in each OSD corresponding to each read data block and the RDMA memory address of each read data block in the client component, so that each OSD corresponding to each read data block reads out the read data block based on the physical read address in the OSD corresponding to the read data block via the RDMA connection between the client component and the OSD corresponding to the read data block, and stores the read data block at the corresponding RDMA memory address of the read data block in the client component.

17. The electronic device of claim 16, wherein, the determining, via the storage engine, the physical read address in the OSD corresponding to each read data block of the read data comprises:

determining, based on second metadata corresponding to the read data, the physical read addresses of each read data block of the read data.

18. The electronic device of claim 10, wherein the first preset threshold refers to a data volume corresponding to a full stripe size preset for a set of stripes obtained after the OSDs comprised in the storage node are divided.

* * * * *